March 1, 1955 — T. R. STONER — 2,703,105
MULTIWAY VALVE UNIT
Filed July 15, 1949 — 2 Sheets-Sheet 1
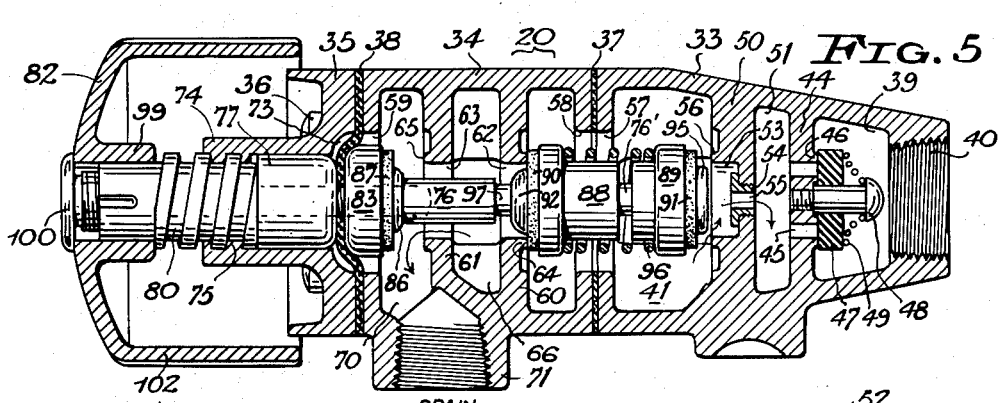
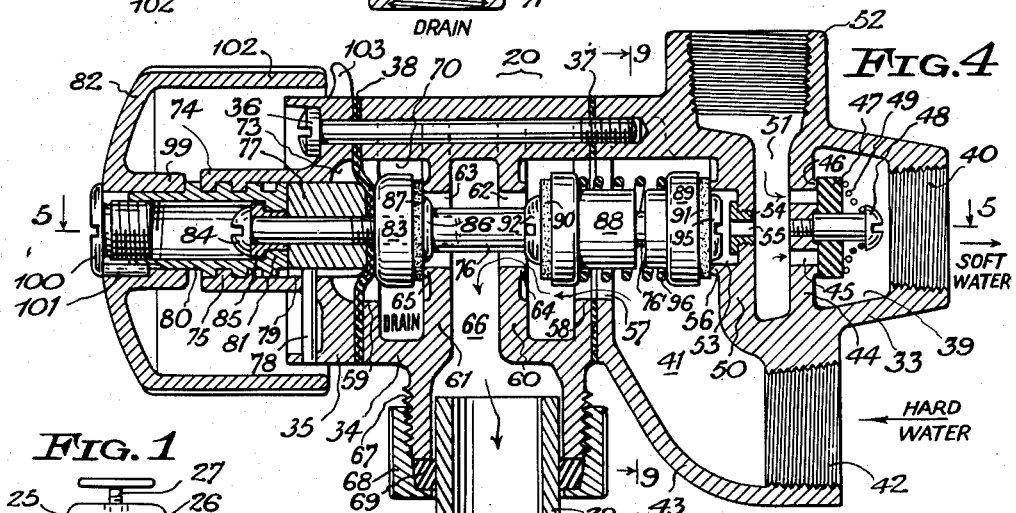
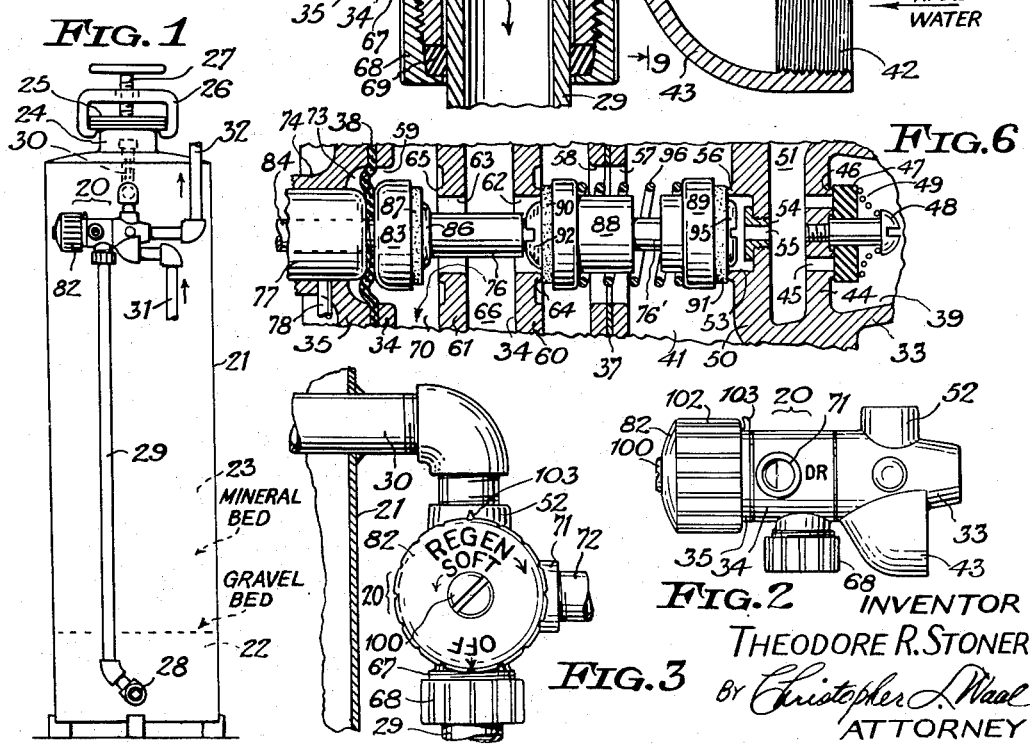
INVENTOR
THEODORE R. STONER
By Christopher L. Naat
ATTORNEY

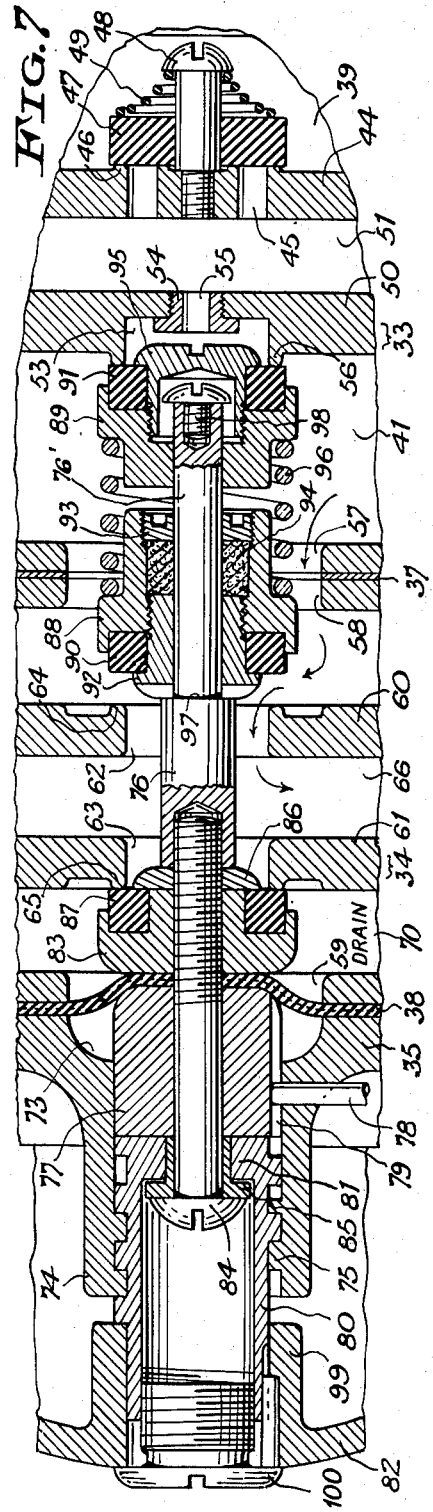

United States Patent Office 2,703,105
Patented Mar. 1, 1955

2,703,105

MULTIWAY VALVE UNIT

Theodore R. Stoner, Milwaukee, Wis.

Application July 15, 1949, Serial No. 104,827

8 Claims. (Cl. 137—625.12)

The present invention relates to valves and more particularly to control valves of the multiple type.

An object of the invention is to provide an improved control valve or master valve adapted for use in conjunction with water-treating apparatus, such as water softeners and filters, and of such character as to simplify the maintenance or servicing of the apparatus.

Another object is to provide improvements on the valve disclosed in my United States Patent 1,966,567, issued July 17, 1934, to the end of simplifying construction and assembly, reducing length, avoiding leakage, and facilitating connection of piping.

Still another object is to provide a multiple-position control valve adapted for use with a water-treating tank and having a stopping position to permit opening of the tank, as for addition of regenerating salt or other material.

A still further object is to perfect details of construction generally.

The invention further consists in the several features herein after described and claimed.

In the accompanying drawings,

Fig. 1 is an elevation of a water softener installation of the single-tank type including a control valve of the invention;

Fig. 2 is a side elevation of the control valve;

Fig. 3 is an end elevation of the valve as it appears when connected to the tank, a wall of the tank being shown in section;

Fig. 4 is a longitudinal sectional elevation of the valve, showing the valve in position for operation in water softening;

Fig. 5 is a longitudinal sectional view of the valve taken generally on the line 5—5 of Fig. 4, showing the valve in position for operation in regenerating the mineral bed of the water softener;

Fig. 6 is a fragmentary longitudinal sectional view of the valve, taken in the plane of Fig. 4, and showing the valve in an intermediate stopping position to permit opening of the tank;

Fig. 7 is an enlarged fragmentary longitudinal sectional view of the valve in the same position as Fig. 4;

Fig. 8 is an end elevation of the valve with an operating handle thereof removed; and Fig. 9 is a transverse sectional elevation of the valve, taken generally on the line 9—9 of Fig. 4, a different selected position of a valve casing member being shown in broken lines.

Referring to the drawings, the numeral 20 designates generally one form of control valve constructed in accordance with the invention. The valve is adapted for use with a water softener of the single-tank type, here shown to comprise an upright mineral tank 21 having the usual gravel bed 22 at its lower end supporting the usual mineral or zeolite bed 23. The tank has a flanged neck 24 at its upper end closed by a gasketed cover plate 25 which is detachably secured to the neck by a C-shaped clamp 26 and a clamping screw 27. At its lower portion the tank is provided with a lateral inlet pipe 28 which extends in the gravel bed 22 and has its outer end connected to the valve by an upwardly projecting pipe 29, as hereinafter described, the valve being placed near the upper end of the tank. At its upper end, the tank has a screened outlet pipe 30 which projects laterally from the tank below the level of the tank neck and is connected to the valve as hereinafter described. This position of the outlet pipe permits draining of a sufficient amount of water from the upper end of the tank to allow introduction of a charge of regenerating salt through the neck opening of the tank. The valve is also connected as hereinafter described to a supply pipe 31 which carries hard or raw water under pressure, and to a service pipe or house pipe 32 which conducts the softened water from the tank to the usual water heater, not shown, and also in some instances directly to a faucet, not shown. In a water softener of this type, the water is softened during its upward flow in the tank, and when regeneration of the mineral bed is required the valve is adjusted, as hereinafter described, to cause a downward flow of brine and flushing water in the tank.

The valve 20 includes a body or casing comprising a plurality of serially connected coaxial body members or sections 33, 34, and 35, which have flat-faced joint-forming ends and are secured together by four equally spaced screws 36 extending parallel to the body axis and arranged in a bolt circle coaxial with the body, the screws passing through the body members 34 and 35 and being tapped into the body member 33. The screw heads bear against the body member 35 which forms a valve bonnet. An annular gasket 37 is interposed between the flat-faced ends of the body members 33 and 34, and a gasket-forming flexible diaphragm 38, such as of reinforced rubber, is clamped between the flat-faced ends of the body members 34 and 35. Each of the body members can be placed in the body assembly in any one of four angularly spaced positions, so as to facilitate connection of piping, two of these positions being indicated by full and broken lines in Fig. 9.

The body member 33 has a chamber 39 with an axial screw-threaded outlet opening 40 at its outer end, and also has a pressure chamber or inlet chamber 41 with a screw-threaded inlet opening 42 parallel to the outlet opening 40 and formed in an offset elbow portion 43 of the body member, the two openings facing in the same direction. The inlet opening 42 is connected to the hard water supply pipe 31, and the outlet opening 40 is connected to the soft water service pipe or house pipe 32. Spaced inwardly from the outlet opening 40 is a web or partition wall 44 which is provided with ports 45 opening at a seat 46 engaged by a spring-pressed check valve member 47 to prevent reverse flow of soft water from the house pipe 32 into the valve body and tank. The check valve member is here shown to comprise a rubber disk slidably guided on a headed shoulder screw 48 which is secured in the partition wall 44 in coaxial relation to the valve body, the disk being urged to closed position by a light coiled spring 49 surrounding the screw 48. A second partition wall 50 is spaced inwardly from the partition wall 44 to form between them an outlet or flushing chamber 51 which opens laterally in a radially extending internally screw-threaded boss 52 on the body member 33. The partition wall 50 has formed therethrough a central opening or bore 53 receiving a screw-threaded bushing 54 with a restricted port or passage 55, the size of the port 55 being selected in accordance with the capacity of the softener tank. The inner side of the partition wall 50 has a valve seat 56 which surrounds an enlarged part of the opening 53. The flat-faced inner end of the body member 33 is inwardly flanged and has a central opening 57.

The intermediate body member 34 has opposite flat-faced inwardly flanged ends with respective central openings 58 and 59, the opening 58 registering with the central end opening 57 in the body member 33, and the end opening 59 permitting inward displacement of the flexible diaphragm 38. The body member 34 also has therein axially spaced partition walls 60 and 61 with respective central openings or ports 62 and 63 surrounded by respective valve seats 64 and 65 which face away from each other, the openings or ports 62 and 63 being smaller than the end openings 58 and 59. The water supply chamber 41 extends from the body member 33 to the partition wall 60 of the body member 34. An outlet chamber 66 is formed between the partition walls 60 and 61 of the intermediate body member 34 and communicates with a radially extending nipple 67 which is externally screw-threaded to receive a flanged nut 68 confining and compressing a rubber washer 69 to form a slip joint connection with the upper end of the pipe 29. Another outlet chamber 70, constituting a drain or waste chamber, is formed between the partition wall 61 and the flexible diaphragm 38 and communicates with a radial internally screw-threaded boss 71 formed on the body member 34 and adapted for connection to a drain pipe 72, Fig. 3.

The body member or bonnet 35 has at its inner end a rounded annular recess 73 which permits outward displacement of the flexible diaphragm 38, and also has a central, outwardly projecting tubular hub 74 with internal threads 75 at its outer end portion, the hub being coaxial with the several valve seats. Extending axially in the valve body assembly is a non-rotatable reciprocating valve stem 76 which is carried at one end, as hereinafter described, by a cylindrical guide plunger or follower 77 slidably fitting in the tubular hub 74 of the body member 35. A radial pin 78 is pressed in the body member 35 and has its inner end extending in a longitudinal groove 79 in the guide plunger to prevent rotation of the plunger. A tubular driver 80 is screw-threaded in the hub 75 to turn therein and has an inwardly flanged inner end 81 slidably bearing against the adjacent end of the guide plunger. A cup-shaped handle 82, hereinafter more fully described, is secured to the outer end of the tubular driver.

The central portion of the flexible diaphragm 38 is clamped between the inner end of the guide plunger 77 and a valve member 83 by a screw 84 which extends axially through the plunger and is threaded through the valve member, the head of the screw bearing against a flanged retaining bushing 85 which loosely confines the inwardly flanged inner end of the tubular driver. Rotation of the screw-threaded driver in either direction by the handle thus axially shifts the non-rotatable guide plunger 77 and the valve member 83.

The inner end of the screw 84 passes through a washer 86 and is tightly threaded into the end of the valve stem 76, thus rigidly securing the valve stem to the slidable guide plunger 77 and the valve member 83. The valve member is annularly recessed, Fig. 7, to receive a packing ring 87 of rubber or other suitable material clamped in position by the washer 86. The packing ring cooperates with the valve seat 65 to open or close the drain port 63.

The free end portion of the valve stem 76 has a reduced cylindrical portion 76' on which are slidably mounted valve members 88 and 89 each recessed or cupped to receive respective packing rings 90 and 91 like the packing ring 87. The packing ring 90 for the valve member 88 cooperates with the valve seat 64 and is clamped in place by a flanged bushing 92 which is screwed into the end of the valve member and is slidable on the stem portion 76'. A gland member 93 is secured into the other end of the valve member 88 and confines a stem-engaging packing 94 in the valve member. The packing ring 91 for the valve member 89 cooperates with the valve seat 56 and is clamped in place by a hollow flanged plug 95 screwed axially into the end of this valve member. The slidably mounted valve members 88 and 89 are urged apart by an interposed coiled spring 96, and are limited in their travel on the valve stem by an annular shoulder 97 on the stem and a headed screw 98 engaged axially in the free end of the stem. The valve members 88 and 89 are so arranged that when the reciprocatory valve stem is in the normal terminal position shown in Figs. 4 and 7 the valve member 88 is held off the valve seat 64 by the valve stem shoulder 97 engaging the slidable bushing 92, and the valve member 89 closes the valve seat 56 under the pressure of the spring 96. In the other terminal position of the valve stem, shown in Fig. 5, the valve member 88 closes the valve seat 64 under the pressure of the spring 96, and the valve member 89 is held off the valve seat 56 by the headed screw 98.

In the intermediate position of the valve stem, shown in Fig. 6, both valve members 88 and 89 engage their respective seats 64 and 56 under the pressure of the spring 96, and the valve stem has a small amount of axial lost motion with respect to these valve members.

The cup-shaped valve handle 82 has a central internal hub portion 99 fitting on the reduced outer end of the tubular driver 80 and is attached thereto by a headed screw plug 100 threaded into the driver. The handle is keyed to the driver as by a cylindrical pin 101, the outer end of which is confined and concealed by the head of the screw plug. The handle includes a fluted cylindrical skirt portion 102 which surrounds the valve body member 35. The valve handle is rotatable through approximately one revolution and has three operative positions, marked "Soft," "Off," and "Regen," as indicated in Fig. 3, the "Off" position being about midway of the other two positions. In the "Off" position, the "Off" legend is aligned with a radial index lug 103 formed on the valve body member 35.

In the normal position of the control valve, shown in Figs. 4 and 7, the drain port 63 is closed by the valve member 83, the flushing chamber port 55 is closed by the spring-loaded valve member 89, and the valve member 88 is spaced from the seat 64 of the port 62, permitting access of hard water under pressure from the supply pipe 31, through the valve chamber 41, the open port 62, the chamber 66, and downwardly through the pipe 29 to the lower end of the softener tank 21. When a valve in the house line 32 is opened, water flows upwardly through the softener tank, and the softened water flows out of the tank outlet pipe 30 into the valve chamber 51, and thence past the check valve 47 to the house line.

When the softener requires regeneration, the control valve handle 82 is turned clockwise, as indicated in Fig. 3, about one-half turn to "Off" position, the "Off" legend on the valve handle being then in alignment with the index lug 103 of the valve body. During this manipulation, the spring-loaded valve member 89 remains in engagement with the seat 56, the valve member 88 moves forwardly into engagement with the seat 64, and the drain valve member 83 moves forwardly to open position, as seen in Fig. 6. The drain valve member 83 opens before the valve member 88 closes, but this is only a momentary condition. The opening of the drain valve lowers the water level at the top of the tank, water flowing from the lower end of the tank upwardly through the pipe 29. Both valve members 88 and 89 being closed, the softener tank is shut off from the water supply, so that the tank cover 25 can be removed to permit introduction of a measured charge of salt into the upper end of the tank. The check valve 47 prevents water in the house line 32 from flowing back to the tank. The tank cover 25 is then replaced, and the valve handle 82 is turned further in clockwise direction about one-half turn, causing the drain valve member 83 to open farther, and causing the spring-loaded valve member 89 to move forwardly off the seat 56, as seen in Fig. 5, the spring-loaded valve member 88 remaining in engagement with the seat 64. Hard water under pressure then flows at a slow rate from the inlet chamber 41 through the small port 55 in the nozzle member 54 to the chamber 51, passing into the tank pipe 30 to dissolve the salt and carry it downwardly through the zeolite bed to regenerate the zeolite. The water then flows from the bottom of the tank upwardly through the pipe 29, the valve chamber 66, and the drain chamber 70, the water being discharged through the drain pipe 72. The reverse flow of water is continued until the regeneration is complete and the salt is flushed out. The control valve is then returned to its normal position, shown in Figs. 4 and 7, and the softener is ready to supply softened water.

It will be seen that when either of the valve members 88 and 89 is in closed position the water pressure in the inlet chamber 41 will tend to hold such valve member against its seat, thus minimizing possibility of leakage. The drain valve member 83 is positively closed by rotating the valve handle in the proper direction, the seating of this valve member being unaffected by the presence of the valve members 88 and 89. The absence of external stuffing boxes also minimizes the possibility of leakage. While the valve member 88 has a stuffing box, this valve member is normally open, and any stuffing box leakage which may occur when this valve member is closed would be inconsequential and would be confined to the interior of the valve.

What I claim as new and desire to secure by Letters Patent is:

1. A valve comprising a valve body having first and second chambers therein, siad first chamber having a water inlet nad first and second outlet valve ports, said second chamber having a drain valve port, said first valve port providing communication between said chambers, a first valve member for opening and closing said first valve port, a second valve member for opening and closing said second valve port, a third valve member for opening and closing said drain valve port, and a reciprocable valve stem with which said three valve members are movable, said second valve member having a limited axial lost motion connection with said valve stem and being spring-pressed in closing direction, said reciprocable valve stem at one end of its travel holding said first valve member open and said second and third valve members closed, and said valve stem at the other end of its travel holding said first valve member closed and said second and third valve members open.

2. A valve comprising a valve body having an inlet chamber adapted to receive water under pressure and having an inlet port adapted for a pipe connection, said valve body further having first and second outlet chambers and a discharge chamber, said inlet chamber being disposed between said outlet chambers and having aligned first and second valve ports communicating with said respective outlet chambers, said first outlet chamber having a third valve port forming a drain port aligned with said first and second valve ports, and said first and second outlet chambers having respective ports adapted for pipe connections, said second outlet chamber being interposed between said inlet chamber and said discharge chamber, said discharge chamber having an axially extending port adapted for connection to a discharge pipe, a check valve interposed between said second outlet chamber and said discharge chamber for permitting flow from said second outlet chamber to said discharge chamber but preventing flow in reverse direction, a reciprocable valve stem in said valve body, and three valve members movable with said valve stem for opening and closing said respective valve ports, said second valve port and third valve port being closed by their respective valve members when said first valve port is open, and said second valve port and third valve port being opened by their respective valve members when said first valve port is closed.

3. A valve comprising a valve body having an inlet chamber adapted to receive water under pressure and further having first and second outlet chambers with respective ports adapted for pipe connections to different parts of a water softener tank, said body further having a discharge chamber with a port adapted for connection to a house pipe, a check valve between said discharge chamber and said second outlet chamber for permitting flow from said second outlet chamber to said discharge chamber but preventing flow in reverse direction, said inlet chamber having first and second valve ports respectively communicating with said first and second outlet chambers, said first outlet chamber having a third valve port forming a drain port, first and second valve members for said first and second valve ports to open and close said ports, a third valve member for said third valve port to open and close said port, and a reciprocable valve stem in said body carrying said three valve members and movable to opposite terminal positions, said valve stem in one terminal position holding said first valve member open and said second and third valve members closed, and said valve stem in its other terminal position holding said first valve member closed and said second and third valve members open.

4. A valve comprising a valve body having first and second chambers therein, said first chamber having a water supply inlet and first and second outlet valve ports, said second chamber having a drain valve port, said first valve port providing communication between said chambers, a first valve member for opening and closing said first valve port, a second valve member for opening and closing said second valve port, a third valve member for opening and closing said drain valve port, and a reciprocable valve stem with which said three valve members are movable, said first and second valve members each having a limited axial lost motion connection with said valve stem and being each spring-urged in closing direction, said valve stem being movable to opposite terminal positions and to an intermediate position, said valve stem in one terminal position holding said first valve member open and said second and third valve members closed, said valve stem in the other terminal position holding said first valve member closed and said second and third valve members open, and said valve stem in its intermediate position holding said first and second valve members closed and said third valve member open.

5. A valve comprising a valve body having a pair of spaced coaxial ports and a pressure chamber between said ports, said valve body having walls extending around said pressure chamber and provided with an inlet passage for admitting fluid under pressure to said chamber, said valve body further having outlet chambers communicating with said respective ports, a reciprocable valve stem in said body coaxial with said ports and movable to opposite terminal positions and to an intermediate position, a pair of valve members on said stem movable therewith toward and away from said respective ports to open and close said ports and each valve member having a limited axial lost motion connection with said stem, spring means urging said valve members toward their respective ports, and rotatable actuating means coaxial with said valve stem and operatively connected to said valve stem for reciprocating said stem to open and close said valve members, said valve members selectively opening said ports when said valve stem is in its opposite terminal positions and closing both ports when said valve stem is in its intermediate position, the fluid pressure in said pressure chamber augmenting the closing pressure on said valve members when both of said valve members are in closed position.

6. A valve comprising a valve body having a pressure chamber adapted to receive fluid under pressure and having a pair of spaced coaxial outlet ports, said valve body having walls extending around said pressure chamber and provided with an inlet passage for admitting fluid under pressure to said chamber, said valve body further having outlet chambers communicating with said respective ports, a valve stem axially movable in said pressure chamber to opposite terminal positions and to an intermediate position, rotatable actuating means for reciprocating said valve stem, first and second valve members for said respective ports movable with said stem toward and away from said ports to open and close said ports, each valve member having a limited axial lost motion connection with said stem, and a spring interposed between said valve members and urging said valve members apart toward their respective ports, said first valve member being in open position and said second valve member being in closed position when said stem is in one terminal position, said second valve member being in open position and said first valve member being in closed position when said stem is in its other terminal position, and both said valve members being in closed position when said stem is in its intermediate position, the fluid pressure in said pressure chamber augmenting the closing pressure on said valve members when both of said valve members are in closed position.

7. A valve comprising a valve body having a pressure chamber adapted to receive fluid under pressure and having opposed outlet ports, said valve body having walls extending around said pressure chamber and provided with an inlet passage for fluid under pressure, said valve body further having outlet chambers communicating with said respective ports, a valve stem axially movable in said pressure chamber to opposite terminal positions and to an intermediate position, rotatable actuating means for reciprocating said valve stem, respective valve members for said ports disposed between said ports and each mounted on said stem for limited relative axial movement with respect to each other and with respect to said stem, and resilient means for urging said valve members away from each other, said valve members closing both of said ports when said stem is in its intermediate position and selectively opening said ports when said stem is in its terminal positions, the fluid pressure in said inlet chamber augmenting the closing pressure on said valve members when both of said valve members are in closed position.

8. A valve comprising a valve body having first and second chambers therein, said first chamber having a water supply inlet and first and second outlet valve ports, said second chamber having a drain valve port, said first valve port providing communication between said chambers, a first valve member for opening and closing said first valve port, a second valve member for opening and closing said second valve port, a third valve member for opening and closing said drain valve port, and a reciprocable valve stem with which said three valve members are movable, said third valve member being fixed on said valve stem against relative axial displacement with respect to said stem, said second valve member having a limited axial lost motion connection with said valve stem and being spring-pressed in closing direction, said reciprocable valve stem at one end of its travel holding said first valve member open and said second and third valve members closed, and said valve stem at the other end of its travel holding said first valve member closed and said second and third valve members open.

References Cited in the file of this patent

UNITED STATES PATENTS

| | | |
|---|---|---|
| 148,565 | Jones | Mar. 17, 1874 |
| 1,436,768 | Mackie et al. | Nov. 28, 1922 |
| 1,575,771 | King | Mar. 9, 1926 |
| 1,688,093 | Smith | Oct. 16, 1928 |
| 1,966,567 | Stoner | July 17, 1934 |
| 2,028,586 | Bragg | Jan. 21, 1936 |
| 2,137,406 | Johnson | Nov. 22, 1938 |
| 2,299,079 | Davis | Oct. 20, 1942 |
| 2,309,032 | Zimmerman | Jan. 19, 1943 |

FOREIGN PATENTS

| | | |
|---|---|---|
| 83,871 | Germany | 1895 |